(12) United States Patent
Reed

(10) Patent No.: US 12,060,904 B2
(45) Date of Patent: *Aug. 13, 2024

(54) THREADED FASTENER HAVING A THREAD CREST GREATER THAN ITS THREAD ROOT AND V ANGLES ON THE CREST AND ROOT

(71) Applicant: LOCK-N-STITCH, INC., Turlock, CA (US)

(72) Inventor: Gary Jack Reed, Turlock, CA (US)

(73) Assignee: LOCK-N-STITCH, INC., Turlock, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/394,923

(22) Filed: Aug. 5, 2021

(65) Prior Publication Data

US 2021/0364029 A1 Nov. 25, 2021

Related U.S. Application Data

(63) Continuation of application No. 15/999,030, filed on Aug. 20, 2018, now Pat. No. 11,111,947, which is a continuation of application No. 13/373,629, filed on Nov. 22, 2011, now Pat. No. 10,066,656.

(51) Int. Cl.
*F16B 33/02* (2006.01)
*B23G 5/06* (2006.01)

(52) U.S. Cl.
CPC ............. *F16B 33/02* (2013.01); *B23G 5/06* (2013.01); *B23G 2210/48* (2013.01)

(58) Field of Classification Search
CPC .. F16B 33/02; F16B 25/0047; F16B 25/0069; F16B 25/0068
USPC .................................................. 411/412, 423
See application file for complete search history.

(56) References Cited

U.S. PATENT DOCUMENTS

| | | | | |
|---|---|---|---|---|
| 4,144,795 A * | 3/1979 | Gutshall | ............. | F16B 25/0068 411/413 |
| 5,336,015 A * | 8/1994 | Stewart | ..................... | H05B 7/14 373/91 |
| 6,322,307 B1 * | 11/2001 | Glover | ................ | F16B 25/0068 411/423 |
| 6,481,760 B1 * | 11/2002 | Noel | ........................ | F16L 15/06 411/311 |
| 6,514,025 B2 * | 2/2003 | Watanabe | ............... | F16B 39/30 411/311 |
| 6,767,035 B2 * | 7/2004 | Hashem | ................. | F16L 15/006 285/332.2 |
| 6,976,818 B2 * | 12/2005 | Levey | ..................... | F16B 33/02 411/311 |
| 7,578,043 B2 * | 8/2009 | Simpson | ................. | F16L 15/02 166/380 |
| 2006/0285940 A1 * | 12/2006 | Walther | .............. | F16B 25/0068 411/421 |

* cited by examiner

*Primary Examiner* — Flemming Saether
(74) *Attorney, Agent, or Firm* — BACON & THOMAS, PLLC

(57) ABSTRACT

An interlocking thread with a tooth-cross-section that is wider at its crest than at its root and with "V" angles located both along the crest and the root which tightens into a tapped hole that has a similar thread cross-section.

6 Claims, 4 Drawing Sheets

Fig. 4 A
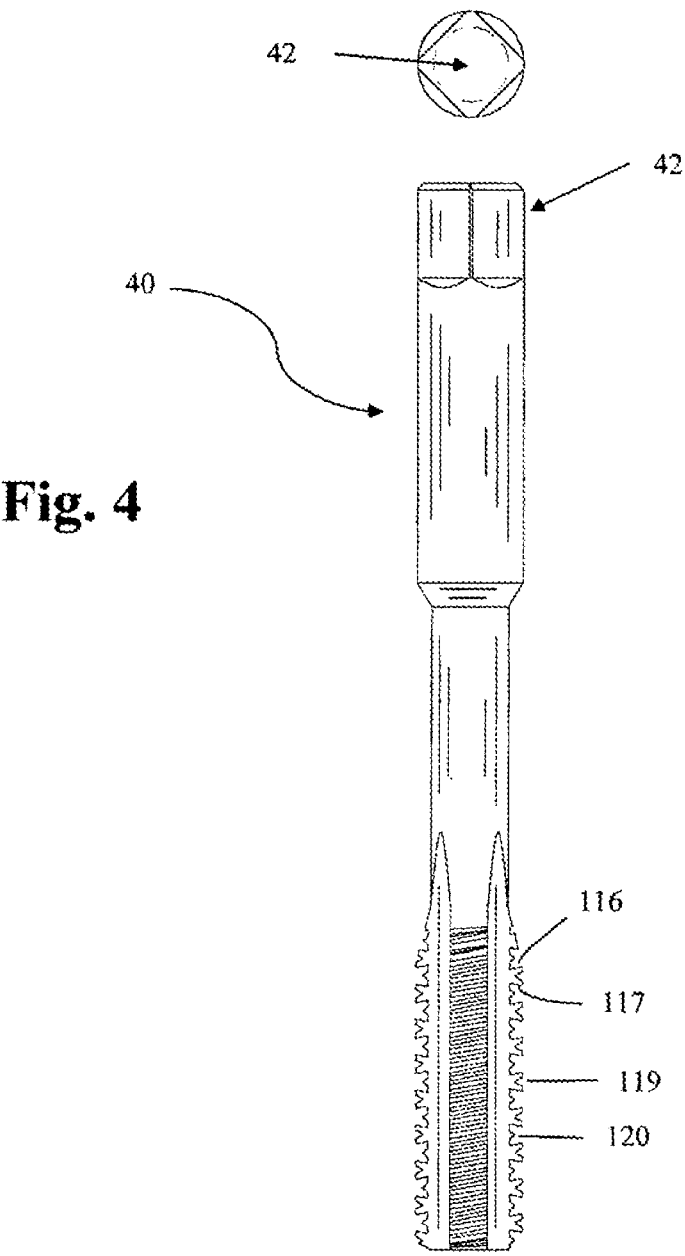
Fig. 4
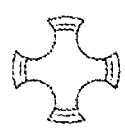
Fig. 4B

THREADED FASTENER HAVING A THREAD CREST GREATER THAN ITS THREAD ROOT AND V ANGLES ON THE CREST AND ROOT

FIELD OF THE INVENTION

The following invention relates generally to fasteners. More particularly, this invention pertains to the field of fasteners having an exterior thread located peripherally about the shaft of the fastener, in which the thread spirals along a portion of the shaft. Most specifically, the thread, when taken in cross-section, has a contour which increases in a dimension as it extends radially away from a root to a crest of the thread. "V" angles are located along the crest and root.

BACKGROUND OF THE INVENTION

Threaded fasteners are extremely old devices which exhibit superior holding properties over non-threaded fasteners primarily due to a higher coefficient of friction. This coefficient of friction is manifested along the inter-face of the threads to its connecting environment. Fasteners where the threaded portion exhibits a dovetail when viewed in cross-section define one specie of threaded fastener.

| Pat. No. | Issue Date | Inventor |
|---|---|---|
| 6,572,315 | Jun. 3, 2003 | Reed |

Applicant herein, Reed, teaches the use of a fastener which benefits from dovetail geometry. While the structure provides excellent benefits, the instant disclosure takes that technology to the next level.

BRIEF SUMMARY OF THE INVENTION

This invention is a new type of thread combination that has the same ability to tighten while creating a radial clamping action as in the earlier patent.

The thread can also be applied to metal stitching pins used to repair cracked and damaged castings. The present invention makes it much easier to repair thin wall castings that currently are very difficult to repair.

This new thread design creates an instant interlocking thread union, vertical loading capability, no counter bore or shoulder required and very good resistance to vertical shear and bending loads. The unique interlocking "double hook" contact surfaces, separated by "V" angles, prevent spreading or drawing forces from occurring when the fastener is tightened. Where vertical loading is required or when no radial spreading or drawing force is desired, such as a set screw, superior performance is exhibited.

The structure according to the present invention is appreciably stronger in retarding axial translation both of the fastener and the material within which the fastener is located. Further, the fastener has appreciably greater strength in resisting bending moments, resisting torsional flexure.

Specifically, first there is an interlocking grip of the double opposing hook threads that prevent outward movement of the sidewalls of the female object.

Second there is a continued gripping of the sidewalls in the event of vertical upward or downward loading.

Third there is resistance to vertical shear loads in situations where it is used to attach sidewalls together.

Fourth there is resistance to bending moments where bending of joined sidewalls is probable.

Fifth there is increased sealing ability of the threaded joint due to its complexity where a gas and/or liquid tight seal is required.

Sixth there is the ability to form this thread by conventional thread rolling processes which make it possible to manufacture cost effectively enough to compete with standard bolts and screws.

OBJECTS OF THE INVENTION

Viewed from a first vantage point, it is an object of the present invention to provide a fastener, comprising, in combination: a shaft having a first end including means to rotate said shaft, said shaft having a thread projecting from an outer periphery of said shaft and spiraling along its length, said thread defined by an upper flank, a lower flank, a root adjacent said shaft and a crest remote from said shaft, said thread defining a dovetail when viewed in section such that said upper and lower flank of one dove tail section diverge outwardly from each other away from said root, said fastener having an indentation on said crest.

Viewed from a second vantage point, it is an object of the present invention to provide a fastener, comprising, in combination: a shaft having a first end including means to rotate said shaft, said shaft having a thread projecting from an outer periphery of said shaft and spiraling along its length, said thread defined by an upper flank, a lower flank, a root adjacent said shaft and a crest remote from said shaft, said thread defining a dovetail when viewed in section such that said upper and lower flank of one dove tail section diverge outwardly from each other away from said root, said fastener having a projection on a gap between adjacent said roots.

These and other objects will be made manifest when considering the following detailed specification when taken in conjunction with the appended drawing figures.

BRIEF DESCRIPTION OF THE DRAWINGS

FIG. 1A amplifies the cut away.

FIG. 4 is a side view of the tap.

FIG. 4A is a top view of the tap.

FIG. 4B is a bottom view of the tap.

DESCRIPTION OF PREFERRED EMBODIMENTS

Figure 1:
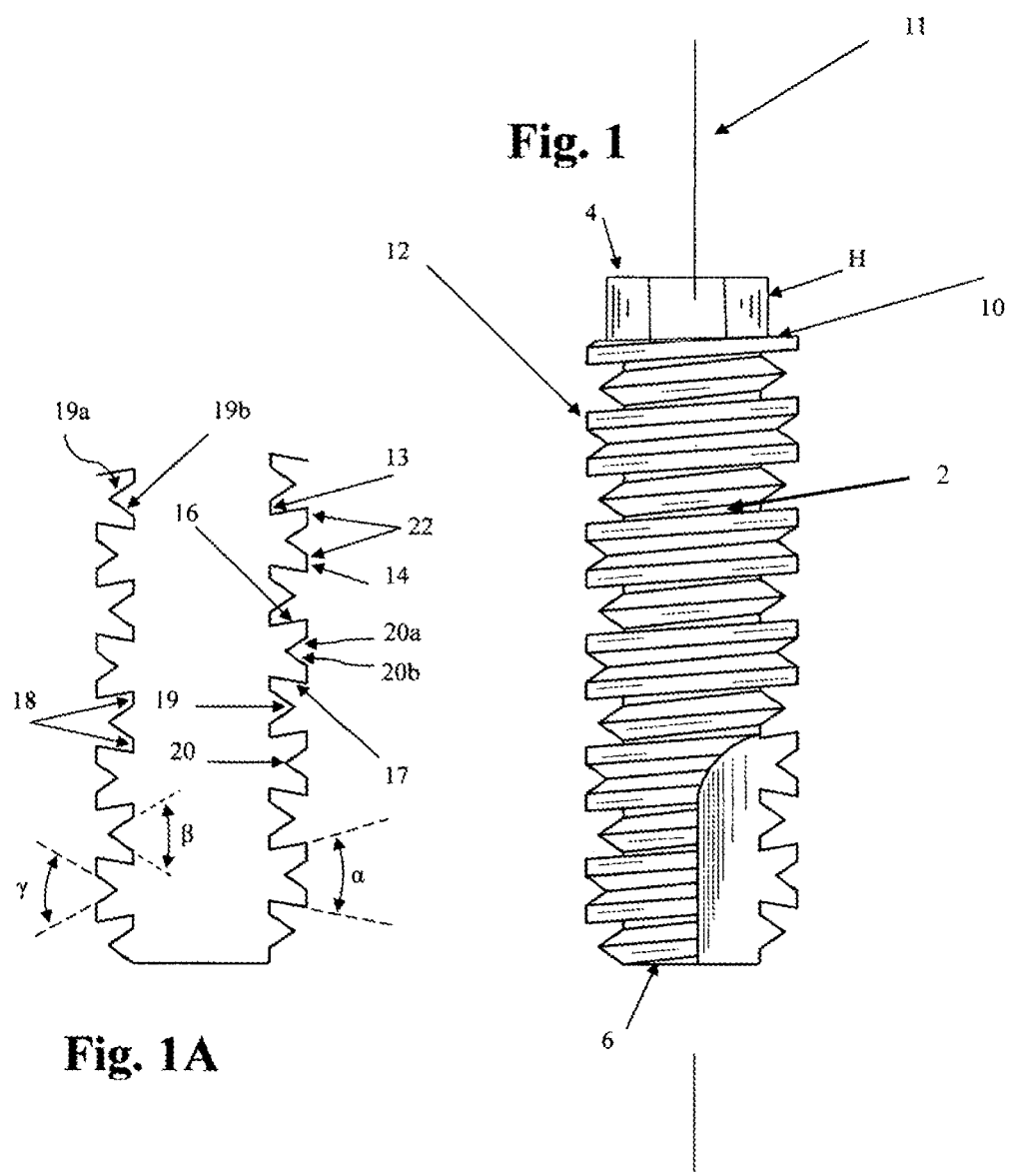
FIG. 1 is a plan view of the threaded fastener having a portion cut away to show the thread profile.

Considering the drawings, wherein like reference numerals denote like parts throughout the various drawing figures, reference numeral 10 is directed to the threaded fastener according to the present invention In general, the fastener 10 includes a shaft 2 preferably of substantially cylindrical configuration or with a taper. FIG. 3 shows a tapered fastener. If the female bore (which receives the fastener FIG. 2) is dimensioned greater than the smallest taper diameter of the fastener 10 but smaller than the greatest taper diameter of the fastener 10, an interference fit results, similar to having varying thread pitch (i.e. increasing from "bottom" to "top").

The fastener 10 has a first end 4 adjacent a "top" thereof and a second end 6 defining a "bottom". Note that the use of terms such as "top", "bottom", "horizontal", etc. are made relative to the drawings appended herewith but are not intended to be directionally limiting. First end 4 may include means to rotate the shaft, such as a hex head or recess H.

The shaft 2 includes an integrally formed thread 12 spirally deployed thereabout. In one embodiment, any cross-section of the thread would appear as a dovetail having an upper pressure angle or flank 16 on a top side thereof and a lower pressure angle or flank 17 on a lower side thereof. The outer surface extending between the upper flank and lower flank defines a crest. The dovetail is supported on the shaft 2 by the root. Areas on the shaft 2 between adjacent dovetails define root gaps 18.

Threaded member 10 of FIG. 1 has a longitudinal axis 11 which passes through the center of the member. An external thread portion 12 is helically wound around the circumference of the member 10. The external thread portion 12 is defined between a minor diameter 13 (at root gap 18) and crest diameter 14.

Interlocking pressure angles (upper) 16 and (lower) 17 are located between the crest diameter 14 and the minor diameter 13. Male and female "V" angles 19 and 20 are found with the male "V" angle 19 at the root gap 18 and female "V" angle 20 at the exterior crest surface of the pressure angles 16 and 17.

In section, each upper pressure angle 16 is parallel to its others. Similarly, each lower pressure angle 17 is parallel to its others. An included angle $\alpha$ between an upper and lower pressure angle may range between 14 and 34 degrees and is preferably 24 degrees.

The root gaps 18 are interrupted by projections which define male "V" angles 19. The "V" shaped pressure angles 19 are formed (in section) by two angle surfaces 19a and 19b which converge as they extend from shaft 2. Preferably, the projections 19a, b define a "V" angle having an acute apex remote from the shaft 2. The subtended acute angle $\beta$ ranges between 65-85 degrees, and preferably is 75 degrees.

The fastener's crest includes a female "V" angle 20 formed (in section) by two angle surfaces 20a and 20b which converge as they extend towards the shaft 2. These surfaces 20 a, b define an indentation in the crest thread and form a "V" angle having an acute angle $\gamma$ where the surfaces converge. Preferably the angle "$\gamma$" is 60 degrees and can range from 50 to 70 degrees.

It is preferred that the gap 18 and the crest periphery 22 retain (respectively) shaft material and thread material. That is, the "V" angles should not extend all the way to the extremities of pressure angles 16, 17. This adds strength to resist shear, torsion, bending, and vertical loading parallel to the long axis 11.

Figure 2:
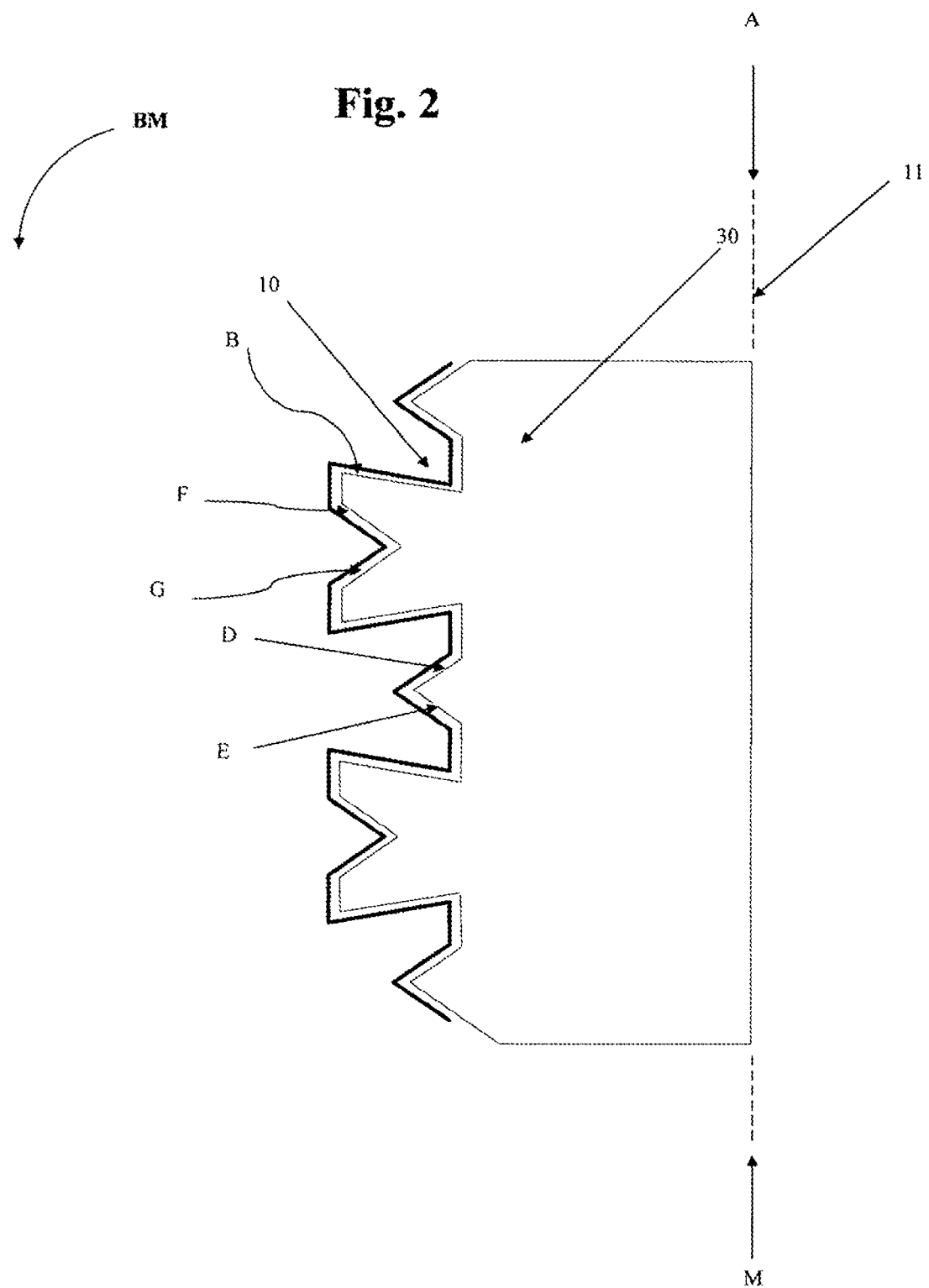
FIG. 2 reflects the fastener as it engages a complementary bore and force dissipation vectors.
Figure 3:
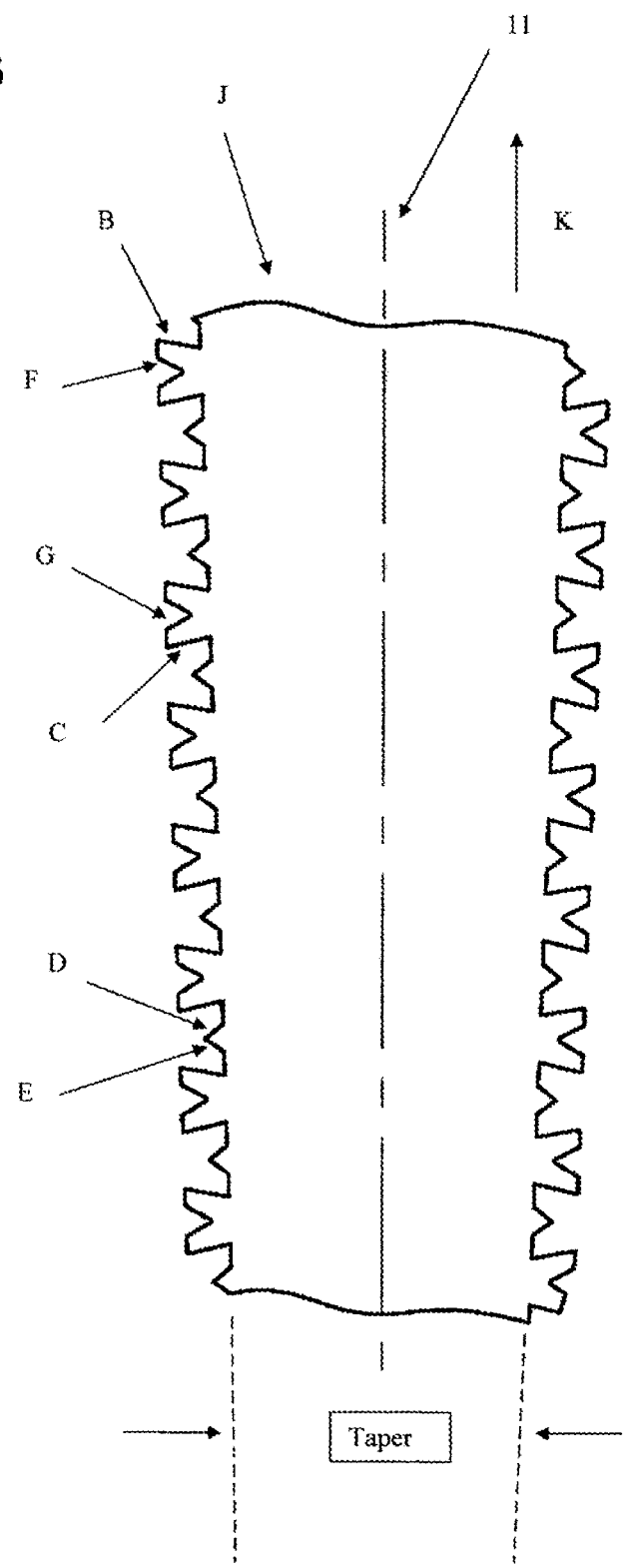
FIG. 3 reflects a tapered shaft and shear load reactions.

FIG. 2 shows a female threaded section 30 with a similar internal threaded profile engaged with a male threaded section 10 to create an interlocking joint. The significance of this instant invention is notably found in the benefits of function when the thread profile is engaged into a matching profile. Several unique and important interactions occur as the helical rotation causes abutted clamping force between two objects.

First there is the interlocking grip of the double opposing hook threads that prevent outward movement of the sidewalls of the female object.

Second there is the continued gripping of the sidewalls in the event of vertical upward or downward loading. FIG. 2 shows a vertical down load A being opposed by the fastener's reaction forces B, C, D, E, F and G. A compressive load, by adding up load M, produce the same reactive forces on the thread, as would a tensile load (i.e. with load A and M in opposite outward directions. Specifically, compressive load M contact with surfaces B, G, and D, while load A is opposed by C, E and F.

Third there is the resistance to vertical shear loads in situations where it can be used to attach sidewalls together. FIG. 3 shows shear loads J and H opposed by forces B, C, D, E, F and G.

Fourth there is the resistance to bending moments where bending of joined sidewalls is probable. FIG. 2 shows a bending moment BM opposed by surfaces/reaction forces B, C, D, E, F and G.

Fifth there is the increased sealing ability of the threaded joint due to its complexity (surface to surface contact, e.g. FIG. 2) where gas and/or liquid tight seal is required.

Sixth there is an ability to form this thread by conventional thread fabricating processes such as cold rolling. Here, the pressure flanks 16, 17 are flared outwardly during formation of the female "V." In other words, the flanks 16, 17 are first formed parallel to each other and then swaged outwardly which make it possible to manufacture cost effectively enough to compete with standard bolts and screws.

FIGS. 4, 4A and 4B show the tap 40 which forms the bore 30. In essence a driving head 42 rotates the tap 40 so that the flutes remove material. The contour of the flute mirrors the fastener (detailed in FIG. 1A) and bears similar reference numerals (incremented by 100). Thus 116 and 117 are cutting elements that form the upper and lower pressure angle flanks 16, 17 respectively. Male "V" angle 19 and female "V" angle 20 are formed by cutting elements 119 and 120 respectively.

Cutting elements 119 and 120 are especially important in that they remove material providing clearance in advance of and in concert with cutting elements 116 and 117, making it possible to form the dovetail threads in a single tapping process. This avoids sequential tapping which therefore avoids potential problems of misalignment when tapping in multiple steps—not to mention added time required.

I claim:

1. A fastener, comprising:
    a shaft having a first end including means to rotate said shaft,
    said shaft having a thread pattern defined by a thread projecting from an outer periphery of said shaft and spiraling along its length;
    said thread defined by an upper flank, a lower flank, a root adjacent said shaft and crest remote from said shaft, wherein the upper and lower flanks diverge outwardly from each other away from said root such that said crest is wider than said root; and
    a "V" shaped protrusion protruding from said shaft between adjacent threads;
    wherein said upper and lower flanks are separated by a "V" shaped indentation.

2. The fastener of claim 1, wherein said "V" shaped indentation is defined by facing inner surfaces of said upper and lower flanks, the inner surfaces converging towards said root to form said "V" shape.

3. The fastener of claim 2, wherein said facing inner surfaces converge at an apex.

4. The fastener of claim 1, wherein said "V" shaped protrusion has a shape complementary to said "V" shaped indentation.

5. The fastener of claim 1, further comprising a root gap separating adjacent threads.

6. The fastener of claim 5, wherein said "V" shaped protrusion protrudes from said shaft in said root gap.

* * * * *